US012211659B2

(12) United States Patent
Studniarek et al.

(10) Patent No.: US 12,211,659 B2
(45) Date of Patent: Jan. 28, 2025

(54) VACUUM INTERRUPTER ASSEMBLY, SWITCHGEAR INCLUDING VACUUM INTERRUPTER ASSEMBLY, AND METHOD OF CONFIGURING VACUUM INTERRUPTER ASSEMBLY

(71) Applicant: ABB Schweiz AG, Baden (CH)

(72) Inventors: Michal Studniarek, Adliswil (CH); Gabriel Lantz, Zürich (CH); Thierry Delachaux, Zürich (CH)

(73) Assignee: ABB Schweiz AG, Baden (CH)

( * ) Notice: Subject to any disclaimer, the term of this patent is extended or adjusted under 35 U.S.C. 154(b) by 168 days.

(21) Appl. No.: 17/980,687

(22) Filed: Nov. 4, 2022

(65) Prior Publication Data

US 2023/0290592 A1 Sep. 14, 2023

(30) Foreign Application Priority Data

Nov. 4, 2021 (EP) .................................... 21206496

(51) Int. Cl.
*H01H 33/662* (2006.01)
*H01H 33/666* (2006.01)

(52) U.S. Cl.
CPC .... *H01H 33/66261* (2013.01); *H01H 33/666* (2013.01); *H01H 2033/66269* (2013.01)

(58) Field of Classification Search
CPC ........... H01H 33/66261; H01H 33/666; H01H 33/664; H01H 33/24; H01H 2033/66269; H01H 2033/66284

(Continued)

(56) References Cited

U.S. PATENT DOCUMENTS 4,002,867 A 1/1977 Cherry
4,088,860 A 5/1978 Abe (Continued)

FOREIGN PATENT DOCUMENTS

DE 4129008 A1 1/1992
EP 0222073 A2 5/1987
JP 2009093922 A 4/2009

OTHER PUBLICATIONS

Extended European Search Report for European Application No. 21206496.8, dated Apr. 21, 2022, 9 pages.

*Primary Examiner* — William A Bolton
(74) *Attorney, Agent, or Firm* — McCarter & English, LLP

(57) ABSTRACT

Described herein is a VI assembly that includes a VI having a stationary contact on a stationary contact potential, a moveable contact on a moveable contact potential, and a vapor shield. The stationary and moveable contacts define a contacting area. The moveable contact is moveable relative to the stationary contact along an axis of the VI. The VI assembly further includes at least one field coupler. The stationary contact and the vapor shield have a predetermined stationary contact-vapor shield capacitance with respect to each other. The moveable contact and the vapor shield have a predetermined moveable contact-vapor shield capacitance with respect to each other. The field coupler is configured such that it adds a field coupler capacitance to at least one of the stationary contact-vapor shield capacitance and the moveable contact-vapor shield capacitance to make the stationary contact-vapor shield capacitance and the moveable contact-vapor shield capacitance substantially equal.

20 Claims, 7 Drawing Sheets

(58) Field of Classification Search
USPC ................................ 218/136, 144, 145, 147
See application file for complete search history.

(56) References Cited

U.S. PATENT DOCUMENTS

| | | | | |
|---|---|---|---|---|
| 7,285,743 | B2 * | 10/2007 | Martin | H01H 33/027<br>218/138 |
| 10,102,989 | B2 * | 10/2018 | Hartmann | H01H 33/662 |
| 10,818,455 | B2 | 10/2020 | Djogo | |
| 2005/0082260 | A1 | 4/2005 | Martin | |
| 2006/0152890 | A1 * | 7/2006 | Yokokura | H01H 33/24<br>361/605 |
| 2012/0145674 | A1 * | 6/2012 | Schellekens | H01H 9/54<br>218/122 |
| 2021/0327666 | A1 * | 10/2021 | Benkert | H01H 1/0203 |

* cited by examiner

VACUUM INTERRUPTER ASSEMBLY, SWITCHGEAR INCLUDING VACUUM INTERRUPTER ASSEMBLY, AND METHOD OF CONFIGURING VACUUM INTERRUPTER ASSEMBLY

CROSS-REFERENCE TO RELATED APPLICATION

This application claims priority to European Patent Application No. 21206496.8, filed Nov. 4, 2021, and titled "VACUUM INTERRUPTER ASSEMBLY, SWITCHGEAR INCLUDING VACUUM INTERRUPTER ASSEMBLY, AND METHOD OF CONFIGURING VACUUM INTERRUPTER ASSEMBLY", which is hereby incorporated by reference in its entirety.

BACKGROUND

The disclosure generally relates to vacuum interrupters, and more particularly to a vacuum interrupter assembly including a field coupler.

Vacuum interrupters (VIs) are used in a wide variety of switchgear, e.g. compact medium and high voltage switchgear, insulated or not insulated by gas. A typical VI has a stationary contact (a fixed contact) opposing a moveable contact (a nonstationary contact) in a contacting area. By moving the moveable contact away from the stationary contact, a space in between the contacts in the contacting area increases and interrupts a current flowing through the contacts. When the contacts are opened in this way, an electrical discharge (i.e., arcing) occurs between the contacts, and parts of the contacts are evaporated due to the electrical discharge. A vapor shield is provided around the contacting area for shielding the VI enclosure from the metal vapor.

Particularly in a case in which miniaturization of the components is demanded, an undesired distortion of the electric field may occur in such a configuration. The electric field distortion stems from, e.g., an internal asymmetry of the VI, a coupling between other switchgear components (i.e., switchgear elements) such as busbars with the enclosure, etc. When the electric field is distorted, the dielectric performance of the VI as a whole is impaired.

U.S. Pat. No. 4,002,867 A discloses a VI having a condensing shield with a coating, the coating directly steering the potential of the vapor shield. This disclosure needs the additional coating, which may be cumbersome to apply.

US 2005/082260 A1 discloses a shield encapsulated VI. Two opposing voltage screens are disposed in the vacuum chamber. A semiconductive coating is applied to an exposed central portion of the vacuum chamber. Again, this disclosure needs the additional coating, which may be cumbersome to apply.

U.S. Pat. No. 10,818,455 B2 discloses a VI having an elastomeric insulating sleeve around the VI, an insulating housing molded around the VI and a pair of grading capacitors each including an inner and an outer electrode. The insulation between the electrodes is solid insulation of the housing molded at the time when the housing is molded. The capacitance of the field grading capacitors is substantially equal to each other. This disclosure requires that the electrodes of the field grading capacitors are molded into the insulating housing at the time of manufacturing the VI. Moreover, the field grading capacitors do not account for asymmetrical field distortions.

Vacuum interrupters are often used in different kinds of switchgear, thus resulting in different electrical environments. The different properties may result in one vacuum interrupter having different dielectric characteristics in different settings, e.g., in different kinds and/or configurations of switchgear. The disclosures discussed above require that any elements that account for field distortion are present at the time of manufacturing the VI, or which may be cumbersome to apply after the manufacturing process. There is a demand for a vacuum interrupter assembly or a method of configuring a vacuum interrupter assembly in which the vacuum interrupter has favorable dielectric properties that are adaptable to the electrical environment.

BRIEF DESCRIPTION

According to an aspect of the present disclosure, a vacuum interrupter, VI, assembly is provided. The VI assembly includes a VI and at least one field coupler including an electrically conductive material. The VI has a moveable contact that is moveable relative to a stationary contact along an axis of the VI. The stationary and moveable contacts define a contacting area. The stationary contact is on an electrical potential which is referred herein to as stationary-contact potential. The moveable contact is on an electrical potential which is referred herein to as moveable-contact potential. A vapor shield is disposed around the contacting area. The stationary contact and the vapor shield have a predetermined mutual capacitance defined as a stationary contact-vapor shield capacitance. The moveable contact and the vapor shield have a predetermined mutual capacitance defined as a moveable contact-vapor shield capacitance. The field coupler is arranged and configured such that it adds a field coupler capacitance to at least one of the stationary contact-vapor shield capacitance and the moveable contact-vapor shield capacitance, such that the resultant stationary contact-vapor shield capacitance and moveable contact-vapor shield capacitance are substantially equal.

The stationary contact-vapor shield capacitance is the capacitance that is established between the stationary contact and the vapor shield. The moveable contact-vapor shield capacitance is the capacitance that is established between the moveable contact and the vapor shield. Both the stationary contact-vapor shield capacitance and the moveable contact-vapor shield capacitance need not necessarily be known by their exact value, but within a deviation range, e.g., due to a parasitic error such as a measurement deviation, a simulation deviation with respect to reality, etc. The deviation range is, for example, 20% or less of the true value, and may be 10% or less of the true value, of the respective capacitance.

Substantially equal, as used herein, includes a certain deviation from perfect equality; yet the capacitances have values sufficiently close to each other such that detrimental effects on the dielectric behavior of the VI are alleviated. In an example, substantially equal, as used herein, includes a deviation from perfect equality of about 10% or less; in another example, substantially equal, as used herein, includes a deviation from perfect equality of about 20% or less.

An effect provided by the techniques disclosed herein is that the field coupler, by adding the field coupler capacitance, counterbalances to some extent the field asymmetry of the electric field in the VI, and screens a field distortion effect of e.g., a switchgear tank that the VI is actually installed in. This may help to reduce a shift of a vapor shield potential to an unfavorable value, and decrease the electric field strength on the contacts. For example, the maximum field stress in an actual switchgear in which the VI assembly is installed in is significantly lowered.

In an embodiment, one field coupler is provided, and the field coupler is galvanically connected to either the moveable contact potential or the stationary contact potential. In the variant in which the field coupler is galvanically connected to the moveable contact potential, the field coupler capacitance is configured such that it is substantially the difference between the stationary contact-vapor shield capacitance and the moveable contact-vapor shield capacitance. In the variant in which the field coupler is galvanically connected to the stationary contact potential, the field coupler capacitance is configured such that it is substantially the difference between the moveable contact-vapor shield capacitance and the stationary contact-vapor shield capacitance.

In an embodiment, two field couplers are provided, and a first field coupler of the two field couplers is galvanically connected to the moveable contact potential, and a second field coupler of the two field couplers is galvanically connected to the stationary contact potential. A field coupler capacitance of the first field coupler and a field coupler capacitance of the second field coupler are configured such that the sum of the moveable contact-vapor shield capacitance and the field coupler capacitance of the first field coupler is substantially the sum of the stationary contact-vapor shield capacitance and the field coupler capacitance of the second field coupler.

In an embodiment, a plurality of field couplers is provided. In a first variant of the embodiment, n field couplers are galvanically connected to the moveable contact potential each contributing to and summing up to a moveable-contact field coupler capacitance, where n is an integer equal to or greater than 1, wherein the moveable-contact field coupler capacitance is configured such that it is substantially the difference between the stationary contact-vapor shield capacitance and the moveable contact-vapor shield capacitance. In a second variant of the embodiment, n field couplers are galvanically connected to the stationary contact potential each contributing to and summing up to a stationary-contact field coupler capacitance, where n is an integer equal to or greater than 1, wherein the stationary-contact field coupler capacitance is configured such that it is substantially the difference between the moveable contact-vapor shield capacitance and the stationary contact-vapor shield capacitance. In a third variant of the embodiment combining the first and second variants, the stationary-contact field coupler capacitance and the moveable-contact field coupler capacitance are configured such that the sum of the moveable-contact field coupler capacitance and the moveable contact-vapor shield capacitance is substantially the sum of the stationary-contact field coupler capacitance and the stationary contact-vapor shield capacitance.

In an embodiment, a floating field coupler is provided. The floating field coupler is on a floating potential, i.e., is not galvanically connected to any defined potential of the VI. The field coupler in this case can be thought of a series connection of a first and a second partial capacitance, wherein the floating potential is present on a connection point of the series connection. The first and second partial capacitances are in series connection between the vapor shield and one of either the stationary contact or the moveable contact. An additional coupling capacitance is present between the floating potential and the ground potential. The partial capacitances are configured such that the sum of the stationary contact-vapor shield capacitance and a term in which the product of the first partial capacitance and the additional coupling capacitance is divided by the sum of the first partial capacitance and the second partial capacitance and the additional coupling capacitance is substantially equal the sum of the moving contact-vapor shield capacitance and a term in which the product of the first partial capacitance and the second partial capacitance is divided by the sum of the first partial capacitance and the second partial capacitance and the additional coupling capacitance. In another way of expressing this configuration, the first partial capacitance $C_{coupler,1v}$ and the second partial capacitance $C_{coupler,2v}$ are configured such that the following equation is fulfilled, wherein $C_{c\text{-}G}$ designates the additional coupling capacitance, $C_{F\text{-}S}$ designates the stationary contact-vapor shield capacitance, $C_{M\text{-}S}$ designates the moving contact-vapor shield capacitance, and wherein "=" designates "substantially equal":

$$C_{F\text{-}S}+C_{coupler,1v}C_{c,G}/(C_{coupler,1v}+C_{coupler,2v}+C_{c\text{-}G})=C_{M\text{-}S}+C_{ccoupler,1v}C_{coupler,2v}/(C_{coupler,1v}+C_{coupler,2v}+C_{c\text{-}G})$$

In embodiments, the field coupler capacitance is configured by approximation. The approximation employs a concentric cylinder formula of the capacitance. For example, the equation $$C_{coupler}=\frac{\alpha\epsilon l}{\ln\left(\frac{R_2}{R_1}\right)}$$

is employed, wherein $R_1$ is the radial distance from the axis to an outer circumferential surface of the vapor shield, $R_2$ is the radial distance from the axis to a surface of the field coupler opposing the outer circumferential surface of the vapor shield, $\alpha$ is the angle—in radian—of extension of the surface of the field coupler in a circumferential direction, 1 is the length of the field coupler in the axial direction, and $\varepsilon$ is the permittivity in the space between the field coupler and the vapor shield.

In embodiments, each field coupler is galvanically connected to at most one of the stationary contact potential or the moveable contact potential. In other words: The field coupler or the field couplers is/are either floating or only connected to either the stationary contact potential or the moveable contact potential.

In embodiments, each of the vapor shield, the stationary contact and the moveable contact have metal surfaces exposed towards the contacting area. In particular, each of the vapor shield, the stationary contact and the moveable contact are, at least in a region thereof directing towards the contacting area and having a main electrical impact on the contacting area, uncoated.

In embodiments, the field coupler is substantially entirely made of the electrically conductive material. In particular, at least a plate-like part in a vicinity of the contacting area, as discussed below, is substantially entirely made of the electrically conductive material. An electrically conductive material, as used herein, includes at least one or more of a metal or a metal alloy, such as—without limitation—copper or copper alloy or aluminum or aluminum alloy, or any non-metal material that is treated, e.g., by coating, to be electrically conductive, such as—without limitation—a polymer having a conductive paint coated thereon.

In embodiments, the field coupler includes an elongated part and a plate-like part. The elongated part extends substantially in the direction of the axis. The plate-like part is arranged in a vicinity of the contacting area. Vicinity, as used herein, is a region in which the capacitive coupling of the field coupler has an effect on the vapor shield, i.e. the capacitive coupling between one of the feeding directions of the VI and the vapor shield is increased. In embodiments, in a projection onto a plane orthogonal to the radial direction, the plate-like part has a substantially round shape.

In embodiments, the VI has a VI length along a symmetry axis of the VI, and the field coupler has a length in the axial direction that is greater than about 0.2 times the VI length and smaller than about 0.8 times the VI length, and the surface of the field coupler extends about an extension angle between 10 degrees and 180 degrees in the circumferential direction of the VI.

According to another aspect of the present disclosure, a switchgear is provided. The switchgear includes at least one switchgear element and a vacuum interrupter assembly as described herein. The at least one switchgear element contributes to at least one of the predetermined stationary contact-vapor shield capacitance and the predetermined moveable contact-vapor shield capacitance. Thus, the field coupler is configured and arranged such as to account for making the stationary contact-vapor shield capacitance and the moveable contact-vapor shield capacitance substantially equal, with the respective amount that the switchgear element(s) contribute(s) thereto.

Switchgear element, as used herein, includes e.g., a constituent element, a constituent component, a component part, a section, etc., of the switchgear, excluding the VI assembly itself or parts of the VI assembly itself. In other words: The switchgear element is e.g., a component of the switchgear that is present on the switchgear or in the electrical environment of the switchgear, and that has an electrical influence on the at least one of the stationary contact-vapor shield capacitance and the predetermined moveable contact-vapor shield capacitance such that the respective capacitance is influenced, or changed, when the VI assembly is installed in/on the switchgear.

According to yet another aspect of the present disclosure, a method of configuring a vacuum interrupter assembly is provided. The vacuum interrupter assembly includes a vacuum interrupter, VI, having a stationary contact on a stationary contact potential, and a moveable contact on a moveable contact potential. The stationary contact and the moveable contact define a contacting area. The VI further includes a vapor shield disposed around the contacting area. The moveable contact is moveable relative to the stationary contact along an axis of the VI. The stationary contact and the vapor shield have a predetermined stationary contact-vapor shield capacitance with respect to each other. The moveable contact and the vapor shield have a predetermined moveable contact-vapor shield capacitance with respect to each other. The method includes determining, particularly by simulation, a configuration and arrangement of a field coupler including an electrically conductive material such that the field coupler adds a field coupler capacitance to at least one of the stationary contact-vapor shield capacitance and the moveable contact-vapor shield capacitance to make the stationary contact-vapor shield capacitance and the moveable contact-vapor shield capacitance substantially equal.

BRIEF DESCRIPTION OF THE DRAWINGS

The techniques disclosed herein will be even more apparent in the following description of embodiments by referring to the accompanying drawings.

DETAILED DESCRIPTION

Figure 1A:
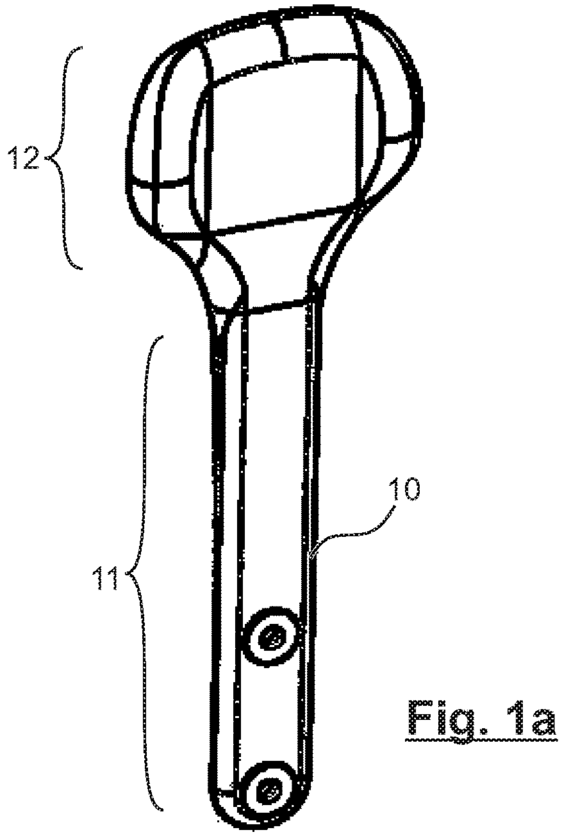
FIG. 1*a* illustrates a perspective view of an exemplary field coupler used in certain embodiments.
Figure 1B:
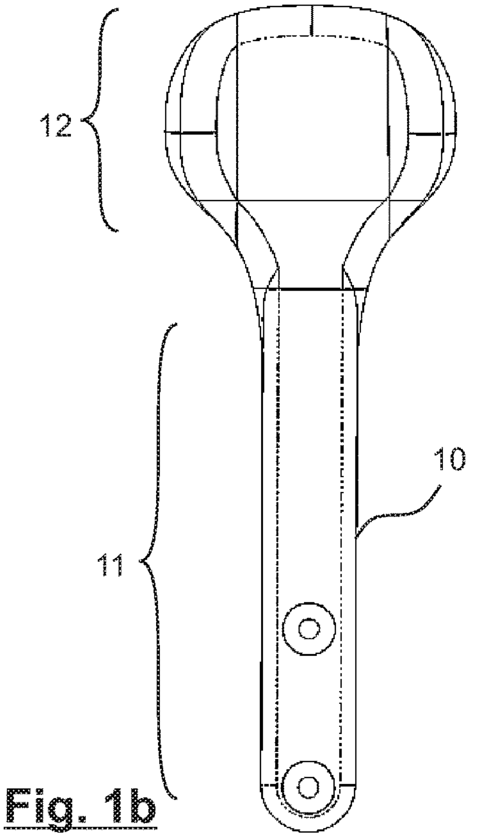
FIG. 1*b* illustrates the exemplary field coupler of FIG. 1*a* in a plan view.
Figure 1C:
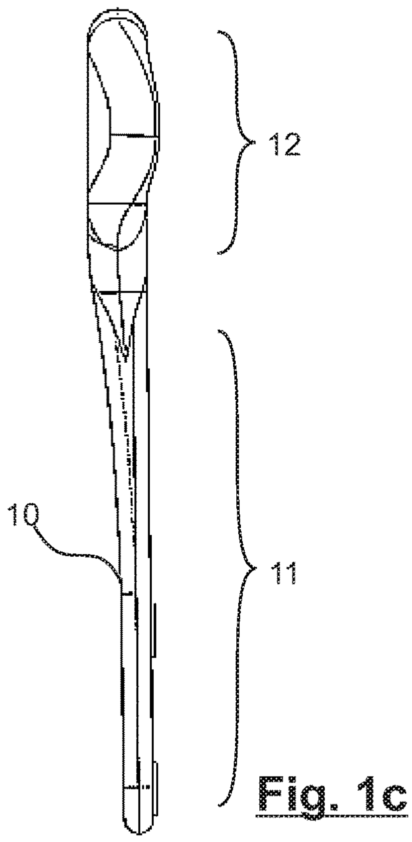
FIG. 1*c* illustrates the exemplary field coupler of FIGS. 1*a* and 1*b* in a plan view from a different angle.

FIGS. 1*a* through 1*c* illustrate a perspective view, a plan view from one angle, and a plan view from another angle, respectively, of an exemplary field coupler 10 used in certain embodiments. The field coupler 10 in this illustration is substantially entirely made of a conductive material and includes an elongated part 11 and a plate-like, substantially round part 12. The elongated part 11 mainly serves for mounting the field coupler 10 in place and for positioning the plate-like part 12 such that it has a favorable capacitive coupling with constituent elements of a vacuum interrupter, to be described below.

FIGS. 2 through 9 each show a vacuum interrupter assembly 100 including a vacuum interrupter 200 and the field coupler 10. The term "vacuum interrupter" may be abbreviated herein as "VI", as appropriate. The VI 200 includes a housing, or encapsulation, 260 disposed around the contacting area 230. A stationary, or fixed, contact 210 is arranged opposite to a non-stationary, or moveable, contact 220 inside the housing 260. The moveable contact 220 is moveable along an axis A. In the drawings, the moveable contact 220 is shown as the bottom contact, and the stationary contact 210 is shown as the top contact. In a region around the bottom end of the stationary contact 210 and the top end of the moveable contact 220, a contacting area 230 is formed.

In the state shown in FIGS. 2 through 9, an opening operation of the VI 200 has just been initiated. The stationary contact 210 and the moveable contact 220 are still close to each other but a small gap is formed therebetween in the contacting area 230. When the VI 200 is conducting a current that flows through the stationary and moveable contacts 210, 220, an arc is formed as soon as the contacts 210, 220 do not touch each other anymore. In the opening operation, when the contacts 210, 220 are separated further away from each other, the arc persists until the contacts 210, 220 have reached a sufficient distance, and the arc is extinguished or ceases to exist. Depending on e.g., the magnitude and type of the current, the voltage involved etc., the arc is formed in the contacting area 230 between the contacts 210, 220. The arc may result in an evaporation of some of the metal material forming the contacts 210, 220. A vapor shield 250 is disposed around the contacting area for alleviating an impact of the evaporated metal material onto an inner surface of the housing 260.

The vapor shield 250 is on a floating electrical potential. In particular, in the type of VI 200 described herein, the vapor shield 250 is not galvanically connected with any one of the stationary or moveable contacts 210, 220, or ground.

Typically, the VI 200 is installed in a compact medium or high voltage switchgear. Medium or high voltage, as used herein, typically includes a rating in a range of about 10 kV to about 200 kV. In a conventional setting, the configuration and arrangement of elements of the switchgear, such as a busbar, neighboring VIs for other phases etc., and/or the configuration and arrangement of elements of the VI 200 itself, such as the enclosure 260 and an internally asymmetric configuration of the VI 200 etc., may lead to a distortion of an electric field that is present in and around the contacting area 230 both during a period when the VI 200 is conducting (i.e., closed) and when the VI 200 is opened. Such one or more elements of the switchgear (i.e., a switchgear element or multiple switchgear elements), thus have an influence on the various capacitances of the VI 200, including the capacitances of the contacts 210, 220 with respect to the vapor shield 250, as discussed further below. In other words: The one or more switchgear elements contribute to the respective capacitances of the VI 200. The one or more switchgear elements having such an influence include e.g., a constituent element, a constituent component, a component part, a section, etc., of the switchgear, excluding the VI 200 itself or parts of the VI 200 itself. Such a distortion of the electric field might compromise the dielectric performance of the VI 200. As mentioned above, the dielectric performance of the VI 200 may depend on the actual switchgear that the VI 200 is installed in. For example, the VI 200 is put into close proximity to other live parts of the switchgear, and grounded components such as a grounded tank. As a result, the electric field at the VI 200 contacts 210, 220 is enhanced, and thus, the VI dielectric performance is degraded.

The dielectric performance of the VI 200 depends to a great extent on the capacitances of the VI 200, probably influenced by the element(s) of the switchgear. It was found that among the capacitances, there are two capacitances that are favorably made substantially equal, namely a capacitance $C_{F-S}$ between the stationary contact (210) and the vapor shield (250), and a capacitance $C_{M-S}$ between the moveable contact (220) and the vapor shield. The capacitance $C_{F-S}$ is herein also referred to as the stationary contact-vapor shield capacitance. The capacitance $C_{M-S}$ is herein also referred to as the moveable contact-vapor shield capacitance. Note that the capacitances $C_{F-S}$, $C_{M-S}$ are parasitic capacitances that influence, e.g., distort, the electric field in the contacting area 230, and that the capacitances $C_{F-S}$, $C_{M-S}$ are predetermined for a given electrical environment of the VI 200, e.g., in a given switchgear environment. The capacitances $C_{F-S}$, $C_{M-S}$ may be obtained for the given electrical environment of the VI 200, for example, by known methods, among others by known methods of calculation, measuring, simulation, or any combination thereof.

The VI assemblies 100 according to embodiments as described herein contribute to alleviating the distortion of the electric field, thus helping to achieve a favorable dielectric performance or behavior of the VI 200 in the actual switchgear that it is installed in. To that end, one or more field couplers 10 are installed. The field coupler(s) 10 is/are arranged such that at least a part thereof is at an outer circumferential surface of the housing 260 in a field coupling region F such that it capacitively couples with the vapor shield 250. The field coupler 10 adds a field coupler capacitance $C_{coupler}$ to at least one of the stationary contact-vapor shield capacitance $C_{F-S}$ and the moveable contact-vapor shield capacitance $C_{M-S}$. The field coupler 10 is configured and arranged such that it makes the stationary contact-vapor shield capacitance $C_{F-S}$ and the moveable contact-vapor shield capacitance $C_{M-S}$ substantially equal. For example, a deviation of at most 10% or at most 5% between the stationary contact-vapor shield capacitance $C_{F-S}$ and the moveable contact-vapor shield capacitance $C_{M-S}$ is achieved by adding the field coupler capacitance $C_{coupler}$ via the field coupler 10.

The field coupler capacitance $C_{coupler}$ may be obtained by a known method, such as methods of calculation, measuring, simulation, or any combination thereof. For example, when the field coupler capacitance $C_{coupler}$ is obtained, a shape, a material, a mounting position, a mounting orientation, or a combination thereof may be established by multiple iterations of electrical field simulation. Conditions for any such simulation may include to optimize the field coupler capacitance $C_{coupler}$ that the shape provides, minimize the breakdown probability between neighboring field couplers 10, or a combination thereof.

For example, the field coupler capacitance $C_{coupler}$ is obtained for a state in which the contacts 210, 220 of the VI 200 are in an open position. However, the field coupler capacitance $C_{coupler}$ may also be obtained for a state in which the contacts 210, 220 of the VI 200 are in an intermediate position.

The field coupler 10 thus interacts capacitively, through the housing 260, with the vapor shield 250. The field coupler 10 may help to correct a field asymmetry resulting from e.g., an internal VI 200 geometry and/or imposed by other switchgear elements, as discussed above. The field coupler 10 may further help to reduce the capacitive coupling between the VI 200 and switchgear elements, particularly a switchgear tank. Provision of the field coupler 10 may also have the effect to reduce the capacitive coupling of the VI 200 components to the ground potential.

In the following, specific embodiments depicted in FIGS. 2 through 8 are discussed. Equivalent circuits depicted in FIGS. 9 through 13 partially corresponding to the configurations in FIGS. 2 through 8 are also referred to. In the equivalent circuits shown in FIGS. 9 through 13, the capacitance $C_{F-M}$ between the contacts 210, 220 is coupled in parallel to the network of the series connection of $C_{F-S}$ and $C_{M-S}$. This parallel connection is coupled between the nominal voltage V and ground. In any of the embodiments discussed herein, the aim is to have the shield potential at substantially $V_S=V/2$ (i.e., sufficiently close to $V_S=V/2$) in order to reduce the electric field stresses on contacts 210, 220. As additional effect, the field coupler 10 screens the contacts 210, 220 and vapor shield 250 from the ground, which reduces the negative impact of a capacitive coupling to the ground.

Figure 2:
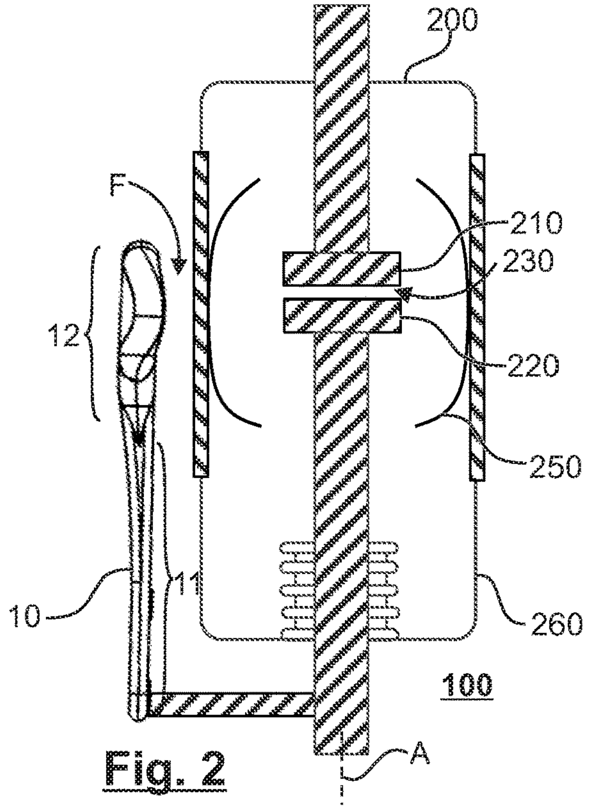
FIG. 2 illustrates an example of a VI assembly according to an embodiment.
Figure 9:
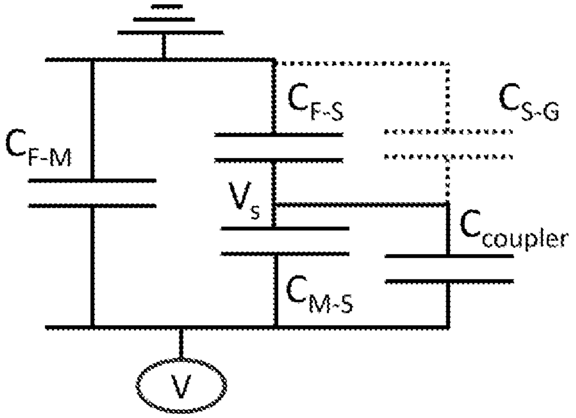
FIG. 9 illustrates a simplified equivalent circuit diagram of the capacitances in an embodiment.

In the embodiment shown in FIG. 2, one field coupler 10 is mounted on the moveable contact 220 such that at least the plate-like part 12 thereof extends on the outside of the housing 260. The field coupler 10 is galvanically brought to the potential of the moveable contact 220. The equivalent circuit shown in FIG. 9 relates to this configuration. In any equivalent circuit shown herein, any connections shown in the circuit diagrams are not necessarily of galvanic nature, and may also be e.g., of capacitive nature. In FIG. 9, the field coupler capacitance $C_{coupler}$ imposed by the field coupler 10 of FIG. 2 is, at one end thereof, galvanically connected to one end of the moveable contact-vapor shield capacitance $C_{M-S}$. It is capacitively coupled to the shield potential $V_S$ between the stationary contact-vapor shield capacitance $C_{F-S}$ and the moveable contact-vapor shield capacitance $C_{M-S}$. The field coupler 10 is designed, configured and arranged such that it adds the field coupler capacitance $C_{coupler}$ to the moveable contact-vapor shield capacitance $C_{M-S}$ such that $C_{F-S}=C_{M-S}+C_{coupler}$.

Figure 3:
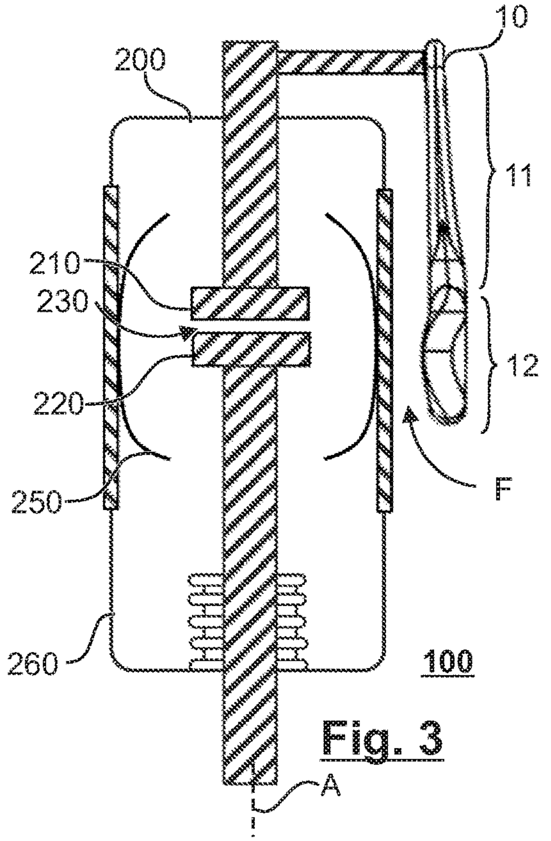
FIG. 3 illustrates an example of a VI assembly according to another embodiment.
Figure 10:
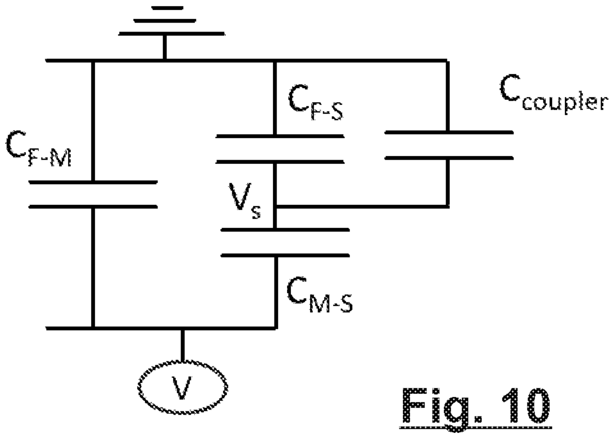
FIG. 10 illustrates a simplified equivalent circuit diagram of the capacitances in another embodiment.

In the embodiment shown in FIG. 3, one field coupler 10 is mounted on the stationary contact 210 such that at least the plate-like part 12 thereof extends on the outside of the housing 260. The field coupler 10 is galvanically brought to the potential of the stationary contact 210. The equivalent circuit shown in FIG. 10 relates to this configuration. In FIG. 10, the field coupler capacitance $C_{coupler}$ imposed by the field coupler 10 of FIG. 3 is, at one end thereof, galvanically connected to one end of the stationary contact-vapor shield capacitance $C_{C-S}$. It is capacitively coupled to the shield potential $V_S$ between the stationary contact-vapor shield capacitance $C_{F-S}$ and the moveable contact-vapor shield capacitance $C_{M-S}$. The field coupler 10 is designed, configured and arranged such that it adds the field coupler capacitance $C_{coupler}$ to the stationary contact-vapor shield capacitance $C_{F-S}$ such that $C_{M-S}=C_{F-S}+C_{coupler}$.

Figure 4:
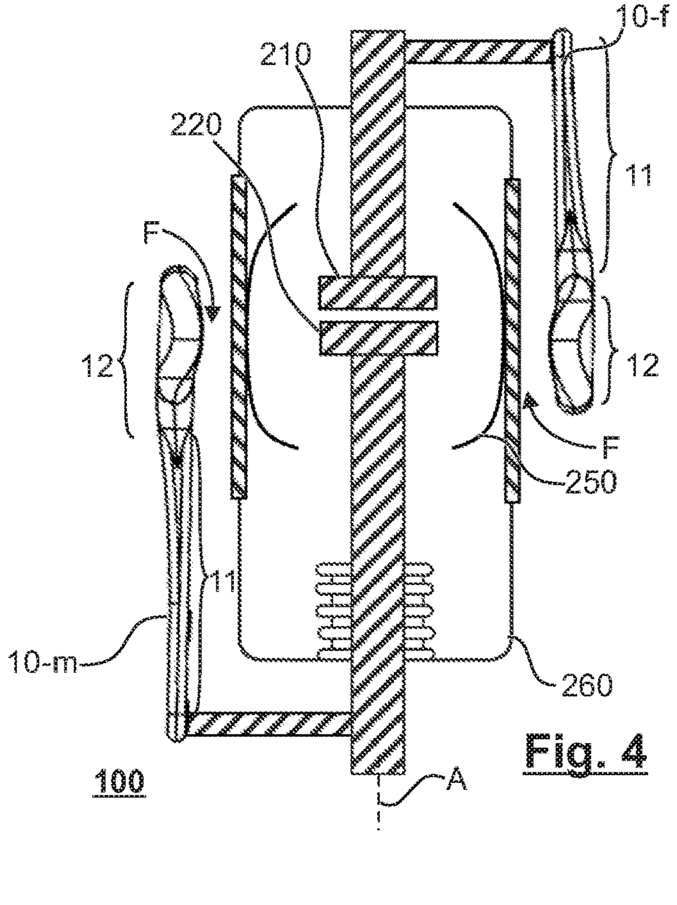
FIG. 4 illustrates an example of a VI assembly according to another embodiment.
Figure 11:
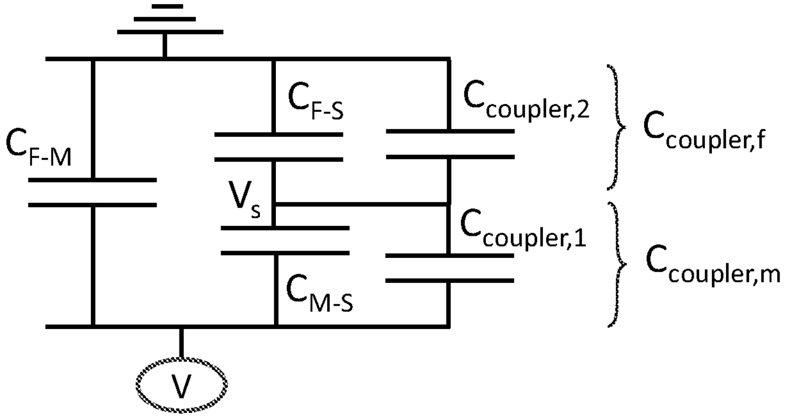
FIG. 11 illustrates a simplified equivalent circuit diagram of the capacitances in yet another embodiment.

In the embodiment shown in FIG. 4, one field coupler 10-*m* is mounted on the moveable contact 220 such that at least the plate-like part 12 thereof extends on the outside of the housing 260, and one field coupler 10-*f* is mounted on the stationary contact 210 such that at least the plate-like part 12 thereof extends on the outside of the housing 260. The field coupler 10-*f* is galvanically brought to the potential of the stationary contact 210. The field coupler 10-*m* is galvanically brought to the potential of the moveable contact 220. The equivalent circuit shown in FIG. 11 relates to this configuration. In FIG. 11, the field coupler capacitance $C_{coupler,m}$ imposed by the field coupler 10-*m* of FIG. 4 is, at one end thereof, galvanically connected to one end of the moveable contact-vapor shield capacitance $C_{M-S}$. It is capacitively coupled to the shield potential $V_S$ between the stationary contact-vapor shield capacitance $C_{F-S}$ and the moveable contact-vapor shield capacitance $C_{M-S}$. The field coupler capacitance $C_{coupler,f}$ imposed by the field coupler 10-*f* of FIG. 4 is, at one end thereof, galvanically connected to one end of the stationary contact-vapor shield capacitance $C_{C-S}$. It is capacitively coupled to the shield potential $V_S$ between the stationary contact-vapor shield capacitance $C_{F-S}$ and the moveable contact-vapor shield capacitance $C_{M-S}$. The field couplers 10-*f*, 10-*m* are designed, configured and arranged such that they respectively add the field coupler capacitance $C_{coupler,m}$ to the moveable contact-vapor shield capacitance $C_{M-S}$ and add the field coupler capacitance $C_{coupler,f}$ to the stationary contact-vapor shield capacitance $C_{F-S}$ such that $C_{M-S}+C_{coupler,m}=C_{F-S}+C_{coupler,f}$.

Figure 5:
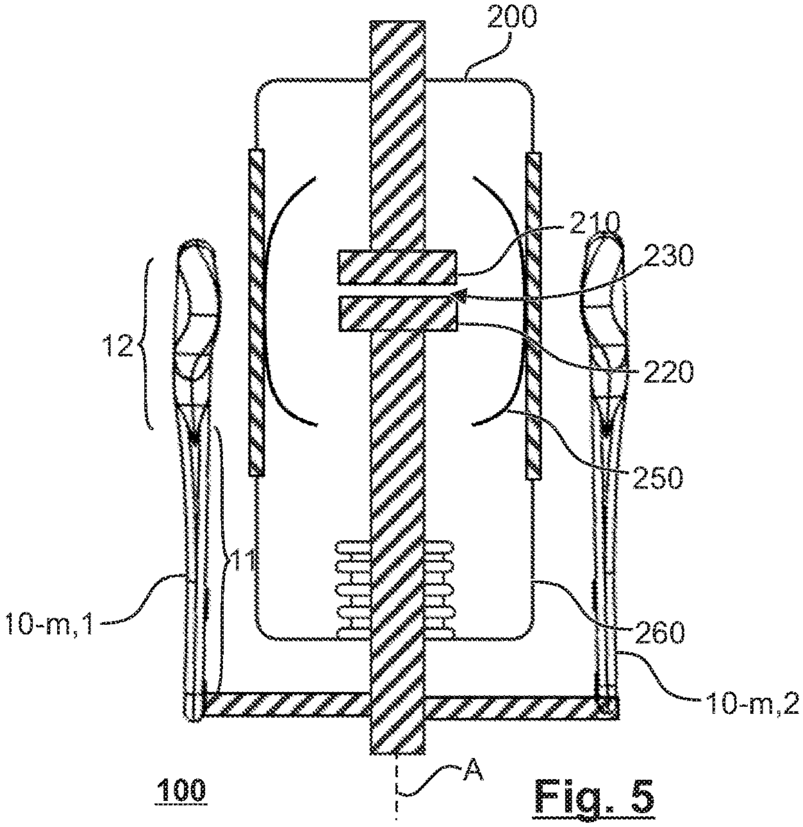
FIG. 5 illustrates an example of a VI assembly according to yet another embodiment.
Figure 6:
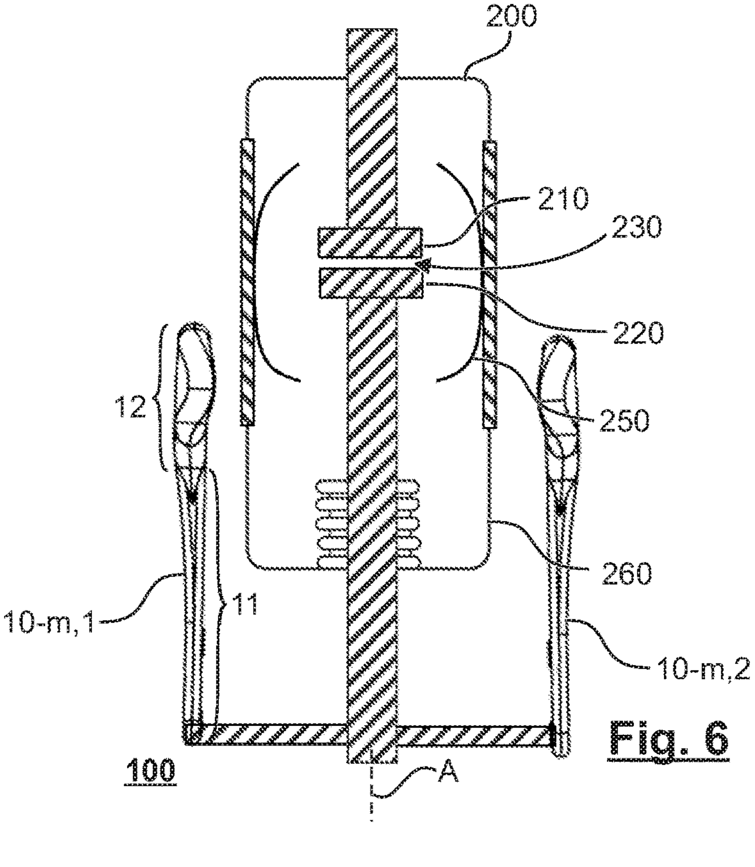
FIG. 6 illustrates an example of a VI assembly according to yet another embodiment.

In the embodiments shown in FIGS. 5 and 6, two field couplers 10-*m*,1, 10-*m*,2 are mounted on the moveable contact 220 such that at least the plate-like part 12 thereof extends on the outside of the housing 260. The field couplers 10-*m*,1 10-*m*,2 are galvanically brought to the potential of the moveable contact 220. In FIG. 5, the plate-like parts 12 are each mounted closer to the contacting area 230, while in FIG. 6, the plate-like parts 12 are each mounted further away from the contacting area 230. In each case, the field couplers 10 are designed, configured and arranged such that they add the field coupler capacitances $C_{coupler,1}$, $C_{coupler,2}$ to the moveable contact-vapor shield capacitance $C_{M-S}$ such that $C_{F-S}=C_{M-S}+C_{coupler,1}+C_{coupler,2}$.

Figure 12:
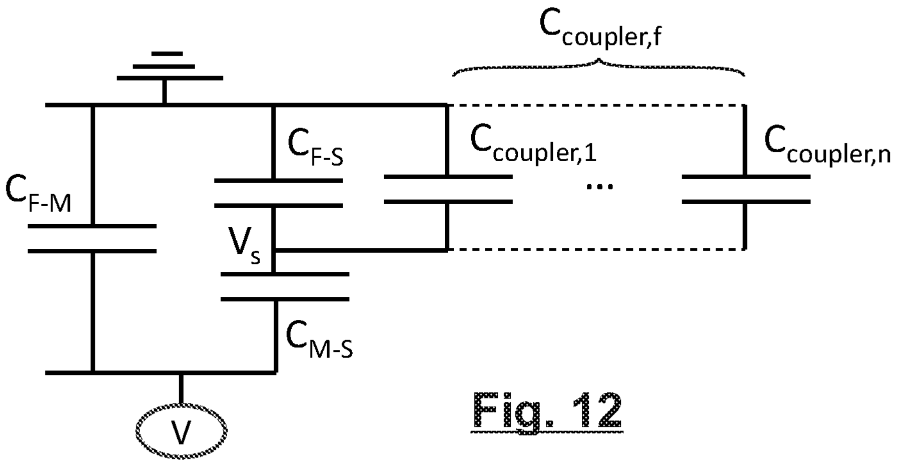
FIG. 12 illustrates a simplified equivalent circuit diagram of the capacitances in yet another embodiment.

The equivalent circuit shown in FIG. 12 relates to a configuration similar to that one shown in FIGS. 5 and 6, but for two field couplers 10-*f*,1 10-*f*,2 mounted on the stationary contact 210 and galvanically brought to the potential of the stationary contact 210, and for the case of n=2. It is noted that more than two field couplers may be provided, in which case n is an integer greater than 2. In FIG. 12, the respective field coupler capacitances $C_{coupler,1}$, $C_{coupler,}$2 imposed by the field couplers 10-*f*,1, 10-*f*,2 are, at one end thereof, galvanically connected to one end of the stationary contact-vapor shield capacitance $C_{F-S}$. They are capacitively coupled to the shield potential $V_S$ between the stationary contact-vapor shield capacitance $C_{F-S}$ and the moveable contact-vapor shield capacitance $C_{M-S}$. The field couplers 10-*f*,1, 10-*f*,2 are designed, configured and arranged such that it adds the field coupler capacitance $C_{coupler}$ to the stationary contact-vapor shield capacitance $C_{F-S}$ such that $C_{M-S}=C_{F-S}+C_{coupler,1}+C_{coupler,2}$.

Figure 7:
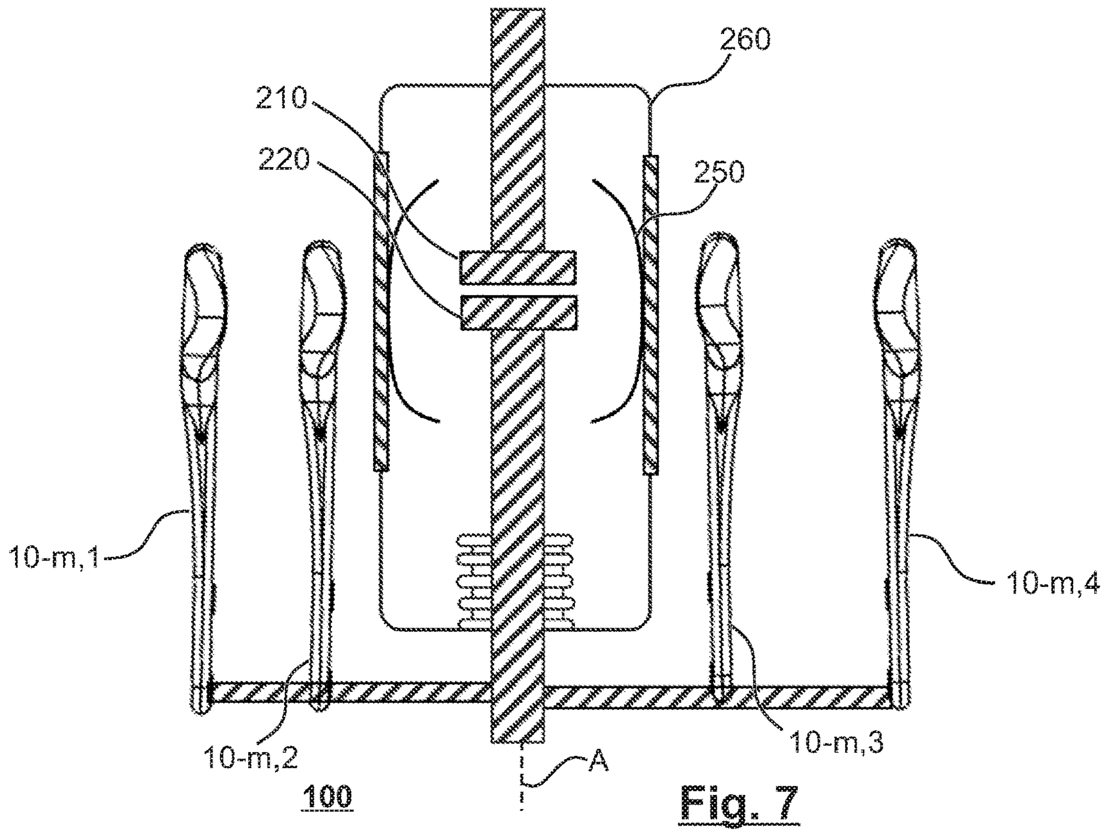
FIG. 7 illustrates an example of a VI assembly according to yet another embodiment.

In the embodiment shown in FIG. 7, four field couplers 10-*m*,1, 10-*m*,2, 10-*m*,3, 10-*m*,4 are mounted on the moveable contact 220 such that at least the plate-like part 12 thereof extends on the outside of the housing 260. The field couplers 10-*m*,1, 10-*m*,2, 10-*m*,3, 10-*m*,4 are galvanically brought to the potential of the moveable contact 220. The field couplers 10 are designed, configured and arranged such that they add the field coupler capacitances $C_{coupler,1}$, $C_{coupler,2}$, $C_{coupler,3}$, $C_{coupler,4}$ to the moveable contact-vapor shield capacitance $C_{M-S}$ such that $C_{F-S}=C_{M-S}+C_{coupler,1}+C_{coupler,2}+C_{coupler,3}+C_{coupler,4}$.

Figure 8:
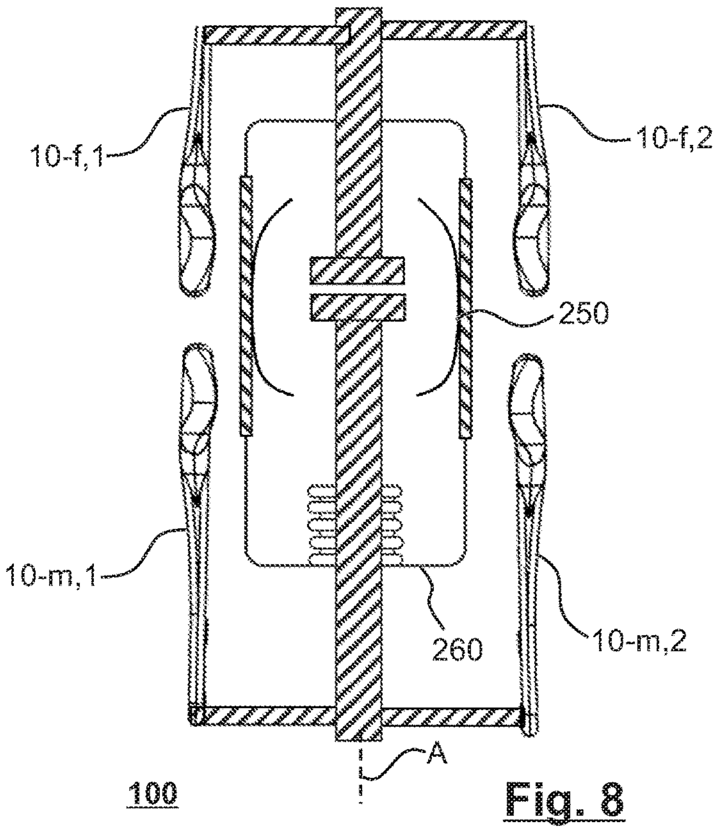
FIG. 8 illustrates an example of a VI assembly according to yet another embodiment.

In the embodiment shown in FIG. 8, two field couplers 10-*m*,1, 10-*m*,2 are mounted on the moveable contact 220 such that at least the plate-like part 12 thereof extends on the outside of the housing 260, and two field couplers 10-*f*,1, 10-*f*,2 are mounted on the stationary contact 210 such that at least the plate-like part 12 thereof extends on the outside of the housing 26. The two field couplers 10-*f*,1, 10-*f*,2 are galvanically brought to the potential of the stationary contact 210. The two field couplers 10-*m*,1, 10-*m*,2 are galvanically brought to the potential of the moveable contact 220. The field couplers 10-*m*,1, 10-*m*,2 have a field coupler capacitance $C_{coupler,m1}$, $C_{coupler,m2}$, respectively. The field couplers 10-*f*,1, 10-*f*,2 have a field coupler capacitance $C_{coupler,f1}$, $C_{coupler,f2}$, respectively. The field couplers 10-*m*,1, 10-*m*,2, 10-*f*,1, 10-*f*,2 are designed, configured and arranged such that they add the field coupler capacitances to the moveable contact-vapor shield capacitance $C_{M-S}$ or the stationary contact-vapor shield capacitance $C_{F-S}$, respectively, such that $C_{M-S}+C_{coupler,m1}+C_{coupler,m2}=C_{F-S}+C_{coupler,f1}+C_{coupler,f2}$.

Figure 13:
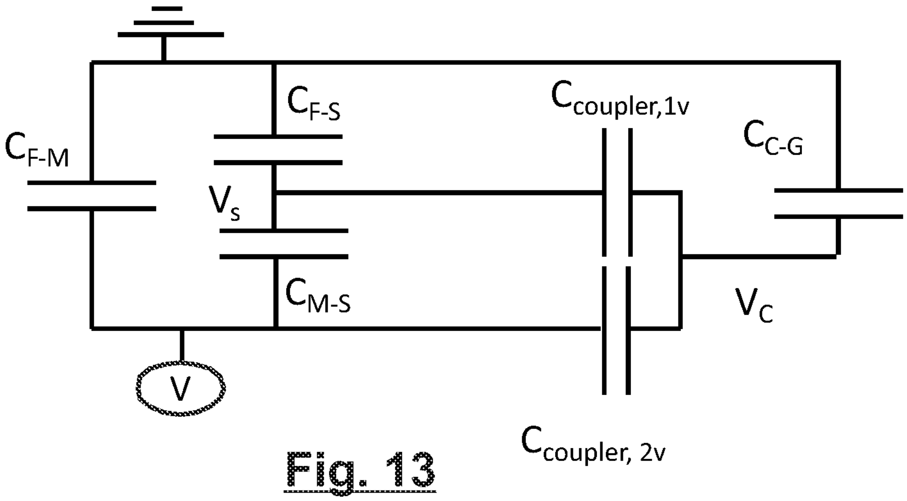
FIG. 13 illustrates a simplified equivalent circuit diagram of the capacitances in yet another embodiment.

In the equivalent circuit shown in FIG. 13, one floating field coupler is provided. The floating field coupler is on floating potential, i.e., it is neither connected to the potential of the stationary contact 210, nor to that of the moveable contact 220. For the purpose of the equivalent circuit, the floating field coupler can be divided into two partial floating field couplers, of which one provides a field coupler capacitance $C_{coupler,1v}$, and the other one provides a field coupler capacitance $C_{coupler,2v}$. The floating field coupler is arranged such that it capacitively couples to the moveable electrode 220. Hence, in the equivalent circuit of FIG. 13, the field coupler capacitances $C_{coupler,1v}$, $C_{coupler,2v}$ are each connected to different ends of the moveable contact-vapor shield capacitance $C_{M-S}$. The field coupler capacitance $C_{coupler,1v}$, is connected to shield potential $V_s$. The field coupler capacitances $C_{coupler,1v}$, $C_{coupler,2v}$ are on floating voltage $V_C$. Furthermore, an additional coupling capacitance $C_{c-G}$ is present between the floating potential $V_S$ and ground potential. The floating field coupler has a capacitive coupling to ground since it is on floating potential. The floating field coupler is designed such that it adds the field coupler capacitances $C_{coupler,1v}$, $C_{coupler,2v}$ such that the following equation is fulfilled, wherein "=" designates "substantially equal":

$$C_{F-S}+C_{coupler,1v}C_{c,G}/(C_{coupler,1v}+C_{coupler,2v}+C_{c-G})=C_{M-S}+C_{ccoupler,1v}C_{coupler,2v}/(C_{coupler,1v}+C_{coupler,2v}+C_{c-G})$$

In the embodiments discussed, a vapor shield-ground capacitance $C_{S-G}$, i.e., the capacitance that is established between the vapor shield 250 and a ground potential, is neglected. However, in the embodiments, consideration may be made as to the vapor shield-ground capacitance $C_{S-G}$. For example, when the field coupler is galvanically connected to the moveable contact potential, the field coupler capacitance $C_{coupler}$ may be configured such that the vapor shield-ground capacitance $C_{S-G}$ is less than a sum of the moveable contact-vapor shield capacitance $C_{M-S}$ and the field coupler capacitance $C_{coupler}$.

Figure 14:
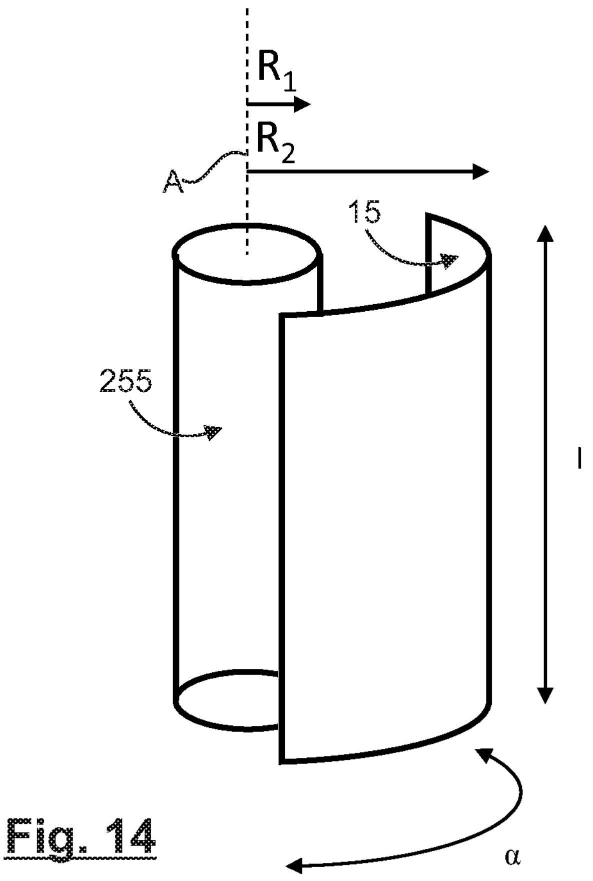
FIG. 14 illustrates a schematic drawing used for explanatory purposes, for performing an approximative calculation of a capacitance.

FIG. 14 illustrates a schematic drawing used for explanatory purposes, for performing an approximative calculation of a capacitance. Note that the exemplary approximation is a rough one, and finer approximations may be conducted either by way of simulation and/or calculation, as need be. For example, the field coupler capacitance is determined by way of approximation. In the example, the approximation employs a concentric cylinder formula of the capacitance, i.e., the equation $$C_{coupler}=\frac{\alpha\epsilon l}{\ln\left(\frac{R_2}{R_1}\right)}.$$

Here, $R_1$ is the radial distance from the axis to an outer circumferential surface of the vapor shield, $R_2$ is the radial distance from the axis to a surface of the field coupler opposing the outer circumferential surface of the vapor shield, α is the angle—in radian—of extension of the surface of the field coupler in a circumferential direction, 1 is the length of the field coupler in the axial direction, and E is the permittivity in the space between the field coupler and the vapor shield. Thereby, an approximation of the capacitance $C_{coupler}$ imposed by a field coupler 10 may be determined by way of calculation.

A dielectric simulation was performed for an exemplary standalone VI 200 and the same type of VI 200 installed in a switchgear. While in the standalone VI 200 the maximum stress on the contacts was still on a permissible level for the application of a certain electrical field strength $E_1$, with a vapor shield potential having a certain value $V_{S1}$ in a range between 50 kV and 100 kV, upon installation of the VI 200 in the switchgear, the vapor shield potential shifted to approximately 0.94 times $V_{S1}$ due to internal field distortion and capacitive coupling to a tank of the switchgear. Thereby, the stress acting on the contacts increased to approximately 1.03 times $E_1$, which was outside the permissible range. Upon installation of a field coupler 10 as described herein, the vapor shield potential was brought back to approximately $V_{S1}$, and the stress on the contacts was lowered to approximately 0.99 times $E_1$. Thereby, the risk of a dielectric breakdown can be significantly lowered.

The invention claimed is:

1. A vacuum interrupter assembly (VI assembly), comprising:

a vacuum interrupter (VI), having a stationary contact on a stationary contact potential, a moveable contact on a movable contact potential, the stationary contact and the moveable contact defining a contacting area, and having a vapor shield disposed around the contacting area, wherein the moveable contact is moveable relative to the stationary contact along an axis of the VI; and at least one field coupler comprising an electrically conductive material, wherein the stationary contact and the vapor shield have a predetermined stationary contact-vapor shield capacitance with respect to each other, wherein the moveable contact and the vapor shield have a predetermined moveable contact-vapor shield capacitance with respect to each other, and wherein the field coupler is arranged and configured such that the field coupler adds a field coupler capacitance to at least one of the stationary contact-vapor shield capacitance and the moveable contact-vapor shield capacitance to make the stationary contact-vapor shield capacitance and the moveable contact-vapor shield capacitance substantially equal, wherein substantially equal includes a deviation from perfect equality of 20% or less.

2. The VI assembly of claim 1, wherein:

the field coupler is galvanically connected to the moveable contact potential, and the field coupler capacitance is configured such that the field coupler capacitance is substantially a difference between the stationary contact-vapor shield capacitance and the moveable contact-vapor shield capacitance.

3. The VI assembly of claim 1, wherein:

the field coupler is galvanically connected to the moveable contact potential, and the field coupler capacitance is configured such that a vapor shield-ground capacitance is less than a sum of the moveable contact-vapor shield capacitance and the field coupler capacitance.

4. The VI assembly of claim 3, wherein the field coupler comprises an elongated part extending substantially in an axial direction, and a plate-like part in a vicinity of the contacting area, and wherein, in a projection onto a plane orthogonal to a radial direction, the plate-like part has a substantially round shape.

5. The VI assembly of claim 3, wherein, when the VI has a VI length along a symmetry axis of the VI, the field coupler has a length in an axial direction that is greater than about 0.2 times the VI length and smaller than about 0.8 times the VI length, and a surface of the field coupler extends about an extension angle between 10 degrees and 180 degrees in a circumferential direction of the VI.

6. The VI assembly of claim 1, wherein:

the field coupler is galvanically connected to the stationary contact potential, and the field coupler capacitance is configured such that the field coupler capacitance is substantially a difference between the moveable contact-vapor shield capacitance and the stationary contact-vapor shield capacitance.

7. The VI assembly of claim 1 comprising two field couplers, wherein:

a first field coupler of the two field couplers is galvanically connected to the moveable contact potential, a second field coupler of the two field couplers is galvanically connected to the stationary contact potential, and a field coupler capacitance of the first field coupler and a field coupler capacitance of the second field coupler are configured such that a sum of the moveable contact-vapor shield capacitance and the field coupler capacitance of the first field coupler is substantially a sum of the stationary contact-vapor shield capacitance and the field coupler capacitance of the second field coupler.

8. The VI assembly of claim 1, comprising n field couplers galvanically connected to the moveable contact potential each contributing to and summing up to a moveable-contact field coupler capacitance, where n is an integer greater than 1, and wherein the moveable-contact field coupler capacitance is configured such that the moveable-contact field coupler capacitance is substantially a difference between the stationary contact-vapor shield capacitance and the moveable contact-vapor shield capacitance.

9. The VI assembly of claim 1, comprising n field couplers galvanically connected to the stationary contact potential each contributing to and summing up to a stationary-contact field coupler capacitance, where n is an integer greater than 1, and wherein the stationary-contact field coupler capacitance is configured such that the stationary-contact field coupler capacitance is substantially a difference between the moveable contact-vapor shield capacitance and the stationary contact-vapor shield capacitance.

10. The VI assembly of claim 1, the VI assembly comprising n field couplers galvanically connected to the moveable contact potential each contributing to and summing up to a moveable-contact field coupler capacitance, where n is an integer greater than 1, wherein the moveable-contact field coupler capacitance is configured such that the moveable-contact field coupler capacitance is substantially a difference between the stationary contact-vapor shield capacitance and the moveable contact-vapor shield capacitance, and the VI assembly comprises m field couplers galvanically connected to the stationary contact potential each contributing to and summing up to a stationary-contact field coupler capacitance, where m is an integer greater than 1, wherein the stationary-contact field coupler capacitance is configured such that the stationary-contact field coupler capacitance is substantially a difference between the moveable contact-vapor shield capacitance and the stationary contact-vapor shield capacitance, and wherein the stationary-contact field coupler capacitance and the moveable-contact field coupler capacitance are configured such that the sum of the moveable-contact field coupler capacitance and the moveable contact-vapor shield capacitance is substantially the sum of the stationary-contact field coupler capacitance and the stationary contact-vapor shield capacitance.

11. The VI assembly of claim 10, wherein each field coupler is galvanically connected to at most one of the stationary contact potential or the moveable contact potential.

12. The VI assembly of claim 1, comprising a floating field coupler on a floating potential, wherein the floating potential exists on a connection point of a series connection of two partial capacitances from the floating field coupler to one of the contacts, and wherein the two partial capacitances are configured such that a sum of the stationary contact-vapor shield capacitance and a term in which a product of a first partial capacitance and an additional coupling capacitance that is present between the floating potential and a ground potential is divided by a sum of the first partial capacitance and a second partial capacitance and the additional coupling capacitance is substantially equal a sum of the moving contact-vapor shield capacitance and a term in which a product of the first partial capacitance and the second partial capacitance is divided by a sum of the first partial capacitance and the second partial capacitance and the additional coupling capacitance, wherein substantially equal includes a deviation from perfect equality of 20% or less.

13. The VI assembly of claim 1, wherein the field coupler capacitance is configured by approximation via a concentric cylinder formula of a capacitance as in the following equation $$C_{coupler} = \frac{\alpha \epsilon l}{\ln\left(\frac{R_2}{R_1}\right)},$$

wherein $R_1$ is a radial distance from the axis to an outer circumferential surface of the vapor shield, $R_2$ is a radial distance from the axis to a surface of the field coupler opposing the outer circumferential surface of the vapor shield, $\alpha$ is an angle, in radian, of extension of the surface of the field coupler in a circumferential direction, 1 is a length of the field coupler in an axial direction, and $\varepsilon$ is a permittivity in a space between the field coupler and the vapor shield.

14. The VI assembly of claim 1, wherein each field coupler is galvanically connected to at most one of the stationary contact potential or the moveable contact potential.

15. The VI assembly of claim 1, wherein each of the vapor shield, the stationary contact and the moveable contact have metal surfaces exposed towards the contacting area.

16. The VI assembly of claim 1, wherein the field coupler is substantially entirely made of the electrically conductive material.

17. The VI assembly of claim 1, wherein the field coupler comprises an elongated part extending substantially in an axial direction, and a plate-like part in a vicinity of the contacting area, and wherein, in a projection onto a plane orthogonal to a radial direction, the plate-like part has a substantially round shape.

18. The VI assembly of claim 1, wherein, when the VI has a VI length along a symmetry axis of the VI, the field coupler has a length in an axial direction that is greater than about 0.2 times the VI length and smaller than about 0.8 times the VI length, and a surface of the field coupler extends about an extension angle between 10 degrees and 180 degrees in a circumferential direction of the VI.

19. A switchgear, comprising at least one switchgear element and comprising the vacuum interrupter assembly according to claim 1, wherein at least one switchgear element contributes to at least one of the predetermined stationary contact-vapor shield capacitance and the predetermined moveable contact-vapor shield capacitance.

20. A method of configuring a vacuum interrupter assembly, the vacuum interrupter assembly comprising a vacuum interrupter (VI), having a stationary contact on a stationary contact potential, a moveable contact on a moveable contact potential, the stationary contact and the moveable contact defining a contacting area, and the VI comprising a vapor shield disposed around the contacting area, wherein the moveable contact is moveable relative to the stationary contact along an axis of the VI, wherein the stationary contact and the vapor shield have a predetermined stationary contact-vapor shield capacitance with respect to each other, wherein the moveable contact and the vapor shield have a predetermined moveable contact-vapor shield capacitance with respect to each other, and wherein the method comprises:

determining, by simulation, a configuration and arrangement of a field coupler comprising an electrically conductive material such that the field coupler adds a field coupler capacitance to at least one of the stationary contact-vapor shield capacitance and the moveable contact-vapor shield capacitance to make the stationary contact-vapor shield capacitance and the moveable contact-vapor shield capacitance substantially equal, wherein substantially equal includes a deviation from perfect equality of 20% or less.

* * * * *